United States Patent
Saitoh

(10) Patent No.: US 9,126,586 B2
(45) Date of Patent: Sep. 8, 2015

(54) ANTISKID APPARATUS, VEHICLE, AND MOTORCYCLE

(71) Applicant: YAMAHA HATSUDOKI KABUSHIKI KAISHA, Iwata-shi, Shizuoka (JP)

(72) Inventor: Tetsushi Saitoh, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 13 days.

(21) Appl. No.: 14/228,587

(22) Filed: Mar. 28, 2014

(65) Prior Publication Data

US 2014/0297079 A1    Oct. 2, 2014

(30) Foreign Application Priority Data

Mar. 29, 2013  (JP) ................. 2013-073607

(51) Int. Cl.
*B60W 20/00* (2006.01)
*B60W 10/02* (2006.01)
(Continued)

(52) U.S. Cl.
CPC ............... *B60W 20/108* (2013.01); *B60K 6/24* (2013.01); *B60K 6/26* (2013.01); *B60K 6/485* (2013.01); *B60K 28/16* (2013.01); *B60W 10/02* (2013.01); *B60W 10/06* (2013.01); *B60W 10/08* (2013.01);
(Continued)

(58) Field of Classification Search
CPC ... B60W 10/02; B60W 10/10; B60W 20/108; B60W 10/06; B60W 20/00; B60W 30/18109; B60W 10/08; B60W 2300/36; B60W 2520/26; B60W 2710/083; B60W 2710/105; B60K 28/16; B60K 6/485; B60K 6/24; B60K 6/26; Y10S 903/93; Y02T 10/6286; B60T 8/176
USPC ........... 701/22, 36, 51, 64, 70, 71, 82, 90, 91; 903/930; 180/65.1, 65.21, 65.265, 180/65.275, 65.28, 65.285
See application file for complete search history.

(56) References Cited

U.S. PATENT DOCUMENTS 5,358,317 A * 10/1994 Cikanek ........................ 303/152
5,450,324 A *  9/1995 Cikanek ........................ 701/108
(Continued)

FOREIGN PATENT DOCUMENTS

JP        4-43832 A     2/1992
JP     11-189067 A     7/1999
(Continued)

OTHER PUBLICATIONS

Amodeo et al, M. Wheel Slip Control via Second-Order Sliding-Mode Generation, IEEE Transactions on Intelligent Transportation Systems, 2010, vol. 11, Issue 1, pp. 122-131.*

(Continued)

*Primary Examiner* — Russell Frejd
(74) *Attorney, Agent, or Firm* — Keating & Bennett, LLP

(57) ABSTRACT

An antiskid apparatus for a hybrid vehicle includes a generator control section that adjusts a deceleration torque of a driving wheel by controlling a power generator to change from an operation of decreasing a generation amount of the power generator to an operation of assisted driving of a crankshaft when an engine rotation speed is higher than a predetermined rotation speed during rapid deceleration in which a vehicle deceleration speed is at a predetermined value or more or during deceleration associated with shift-down through a transmission.

18 Claims, 8 Drawing Sheets

(51) Int. Cl.

| | | |
|---|---|---|
| *B60W 10/06* | (2006.01) | |
| *B60W 10/08* | (2006.01) | |
| *B60W 10/10* | (2012.01) | |
| *B60K 6/485* | (2007.10) | |
| *B60K 6/24* | (2007.10) | |
| *B60K 6/26* | (2007.10) | |
| *B60K 28/16* | (2006.01) | |
| *B60W 30/18* | (2012.01) | |
| *B60T 8/176* | (2006.01) | |

(52) U.S. Cl.
CPC ............... *B60W 10/10* (2013.01); *B60W 20/00* (2013.01); *B60W 30/18109* (2013.01); *B60T 8/176* (2013.01); *B60W 2300/36* (2013.01); *B60W 2520/26* (2013.01); *B60W 2710/083* (2013.01); *B60W 2710/105* (2013.01); *Y02T 10/6286* (2013.01); *Y10S 903/93* (2013.01)

(56) References Cited

U.S. PATENT DOCUMENTS

| | | |
|---|---|---|
| 6,122,587 A * | 9/2000 | Takahara et al. ............... 701/78 |
| 6,932,738 B2 * | 8/2005 | Aoki et al. ..................... 477/5 |
| 7,281,770 B1 * | 10/2007 | Curran et al. ................. 303/151 |
| 8,464,681 B2 | 6/2013 | Matsuo et al. |
| 2007/0278023 A1 | 12/2007 | Masut et al. |
| 2010/0168953 A1 * | 7/2010 | Mizoguchi et al. ............. 701/29 |
| 2010/0229814 A1 | 9/2010 | Matsuo et al. |

FOREIGN PATENT DOCUMENTS

| | | |
|---|---|---|
| JP | 3646632 B2 | 5/2005 |
| JP | 2007-312596 A | 11/2007 |
| JP | 2009-61855 A | 3/2009 |
| JP | 2010-208603 A | 9/2010 |

OTHER PUBLICATIONS

Tan et al, H.-S. Discrete-Time Controller Design for Robust Vehicle Traction, IEEE, Control Systems Magazine, 1990, vol. 10, Issue 3, pp. 107-113.*

Makki et al, A. A Robust Traction Controller Design Using the Theory of Variable Structure Systems, Proceedings of the 36th Midwest Symposium on Circuits and Systems, 1993, vol. 1, pp. 356-359.*

* cited by examiner

| TARGET CONTROL SECTION AND ELEMENT | SIGNS OF FUNCTIONAL BLOCKS, PROCESSING STEP NUMBERS, AND FUNCTIONS OF THE PROCESSING | | | | | | |
|---|---|---|---|---|---|---|---|
| | 126-S23 | 126-S25 ABS | 126-S27 BTL | 126-S29 TCS | 126-S33 | 126-S35 TCS | 126-S37 BTL |
| BRAKE CONTROL SECTION 132 | RESTRICTED | | | | | | |
| ABS HYDRAULIC UNIT 133 | B | A | | | B | | |
| ELECTRICITY CONTROL SECTION 134 | PREPARATION | A | B | | PREPARATION | | |
| GENERATOR 66 | B | B | B | B | B | A | A |
| DC/DC CONVERTER 144 | RESTRICTED | B | B | B | RESTRICTED | A | A |
| ENGINE CONTROL SECTION 136 | | B | B | B | | A | A |
| THROTTLE VALVE | B | B | B | A | B | B | B |
| IGNITION | RESTRICTED | | | A | RESTRICTED | B | B |
| FUEL INJECTION | | | | A | | B | |
| TRANSMISSION CONTROL SECTION 138 | B | B | A | B | B | B | B |
| FIRST CLUTCH ACTUATOR | RESTRICTED | RESTRICTED | A | RESTRICTED | RESTRICTED | RESTRICTED | RESTRICTED |
| SECOND CLUTCH ACTUATOR | RESTRICTED | RESTRICTED | A | RESTRICTED | RESTRICTED | RESTRICTED | RESTRICTED |
| SHIFT MECHANISM | RESTRICTED | RESTRICTED | RESTRICTED | RESTRICTED | RESTRICTED | RESTRICTED | RESTRICTED |

FIG. 7

ANTISKID APPARATUS, VEHICLE, AND MOTORCYCLE

CROSS REFERENCE TO RELATED APPLICATIONS

This application is entitled to and claims the benefit of Japanese Patent Application No. 2013-073607, filed on Mar. 29, 2013, the disclosure of which including the specification, drawings and abstract is incorporated herein by reference in its entirety.

BACKGROUND OF THE INVENTION

1. Field of the Invention

The present invention relates to an antiskid apparatus for a hybrid vehicle which is driven by a plurality of driving sources such as an engine and a motor, and a vehicle and a motorcycle provided with the antiskid apparatus.

2. Description of the Related Art

For engine-driven type vehicles, emitted environmental pollutants are desirably reduced as much as possible from an environmental point of view. Accordingly, in recent years, hybrid vehicles in which an electric motor that drives a wheel is mounted together with an engine so that the driving wheel is driven by the electric motor have been developed and are replacing engine-driven type vehicles.

As such hybrid vehicles, series-hybrid type vehicles are known in which a generator is driven by the engine and a driving motor that drives the driving wheel is driven by the electric power generated by the generator. Moreover, parallel-hybrid type vehicles are known in which the engine and the motor are switched between each other depending on the driving state and/or the remaining amount of electricity in a battery (secondary cell) charged by the generator, and at least one of the engine and the motor is used to drive the driving wheel.

In such a parallel-hybrid type vehicle, if an accelerator pedal is suddenly returned to a fully closed state while the engine is operating at a high rotation speed, the rear wheel, a driving wheel, may exceed its grip limit and slip due to a negative torque (reverse torque or so-called engine brake) of the engine.

Similarly, when the engine rotation increases due to shift down during strong deceleration associated with a braking operation, a deceleration ratio of the transmission becomes large once a clutch is engaged, and a negative torque of the engine is increased and added to a previous braking force. As a result, the rear wheel, which is the driving wheel, may exceed the grip limit and slip.

As a mechanism for reducing the occurrence of slip of the driving wheel, a drive controller such as that disclosed in Japanese Patent No. 3646632 is known and monitors the driving state of a vehicle equipped with a continuously variable transmission (CVT) to determine whether the vehicle is slipping, i.e., in a skid state.

The drive controller avoids, if the vehicle is in a skid state, the skid state by controlling the torque transmitted from the driving wheel by controlling the generator.

The drive controller described in Japanese Patent No. 3646632 is mounted on a CVT and reduces skidding of the vehicle once it has occurred. Specifically, the drive controller is configured to reduce skidding afterward on the basis of the occurrence of skidding. Recently, there has been a demand for an apparatus which can avoid skidding more effectively than drive controllers configured to reduce skidding after it has occurred.

As described above, the apparatus for reducing skidding is mounted on a CVT, and there has been also a demand for smooth driving without causing skidding in the parallel-hybrid type vehicle including a stepped transmission.

Moreover, regarding a parallel-hybrid type motorcycle as the parallel-hybrid vehicle including a stepped transmission, there has been also a demand for smooth driving without skidding.

As a mechanism for reducing the slip of the driving wheel in motorcycles, a slipper clutch that automatically limits a torque transmitted from the driving wheel, i.e., a back torque limiter (also referred to as a BTL) is widely known. In general, the BTL is disposed on the engine side from a shift gear in a power transmission path so as to perform an operation of limiting a reverse torque acting on the BTL itself. As a result, since the reverse torque limited by the BTL or the reverse torque in the rear wheel shaft is transmitted to the rear wheel shaft through a gear stage, the reverse torque varies depending on the gear stage used during the operation.

Specifically, the reverse torque limited in the rear wheel shaft is determined depending on a set gear ratio. For example, the reverse torque limited in the rear wheel shaft is different between a high-speed gear stage (e.g., shift down from a sixth speed to a fifth speed) and an intermediate-speed gear stage (e.g., shift down from a fourth speed to a third speed) or a low-speed gear stage (e.g., shift down from a second speed to a first speed) at which the BTL is operated.

As a result, a reverse torque limit set corresponding to a specific gear shift stage may not provide a setting for suitable operation for other gear stages. Specifically, if a reverse torque limit is set for operation suitable for the low-speed gear stage, the BTL can easily be operated at the high-speed gear stage, which causes a problem of lack of the engine brake. Therefore, even in the case of the motorcycle on which the BTL is mounted, achievement of smooth driving without slip is in demand.

SUMMARY OF THE INVENTION

Preferred embodiments of the present invention provide an antiskid apparatus that is preferably mounted on a parallel-hybrid type vehicle and achieves smooth driving more effectively by avoiding slip of the driving wheel in advance.

A preferred embodiment of an antiskid apparatus of the present invention is an antiskid apparatus for a hybrid vehicle, the hybrid vehicle including an engine that outputs a rotational power from a crankshaft as a propelling force of the vehicle; a power generator that is connected to the crankshaft of the engine, the power generator configured to be driven by a torque of the crankshaft to generate electricity and to generate an auxiliary driving force that assists the propelling force by adding a torque to the output of the crankshaft; a battery that supplies electricity to the power generator and is configured to store the electricity generated by the power generator; and a transmission that changes a speed of a rotation of the crankshaft and transmits the rotation to a driving wheel, the antiskid apparatus including a generator control section that is configured to adjust a deceleration torque of the driving wheel by controlling the power generator to change from an operation of decreasing a generated amount of power from the power generator to an operation of assisting driving of the crankshaft when an engine rotation speed is higher than a predetermined rotation speed during rapid deceleration in which a vehicle deceleration speed is at a predetermined value or more or during deceleration associated with shift-down through the transmission.

A vehicle according to a preferred embodiment of the present invention includes the antiskid apparatus configured as described above. Moreover, a two-wheeled vehicle according to another preferred embodiment of the present invention includes the antiskid apparatus configured as described above.

According to the preferred embodiments of the present invention, the antiskid apparatus is preferably mounted on a parallel-hybrid type vehicle and achieves smooth driving by reliably avoiding the occurrence of skidding, i.e., slipping, of the driving wheel in advance.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a diagram illustrating correspondence between the operation by the antiskid apparatus and each section.

DETAILED DESCRIPTION OF THE PREFERRED EMBODIMENTS

Preferred embodiments of the present invention will be described below in detail with reference to the accompanying drawings. In a preferred embodiment of the present invention, a vehicle provided with a reciprocating engine, preferably a reciprocating internal combustion engine, is explained with reference to a motorcycle. In the various preferred embodiments of the present invention, front, rear, left and right mean front, rear, left, and right as seen by the driver seated on the seat of the motorcycle.

Figure 1:
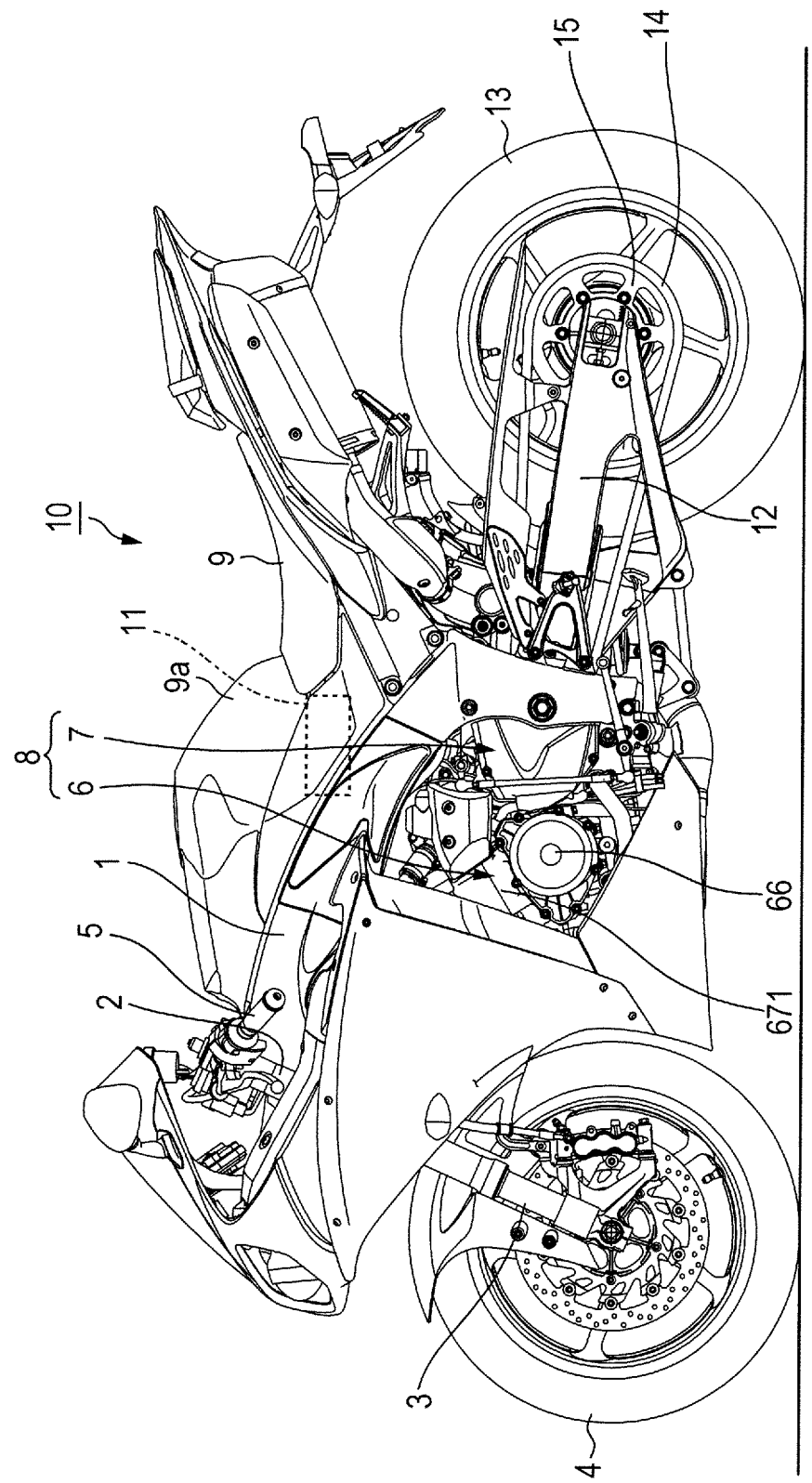
FIG. 1 is a left side view of a motorcycle provided with an antiskid apparatus according to a preferred embodiment of the present invention.

FIG. 1 is a left side view of the motorcycle provided with an antiskid apparatus according to a preferred embodiment of the present invention.

The motorcycle provided with the antiskid apparatus is preferably a parallel-hybrid type motorcycle which switches between the engine and the motor depending on the driving state and/or remaining amount of electricity in a battery to be charged by a generator, and uses at least one of the engine and the motor to drive the driving wheel.

The engine, a reciprocating internal combustion engine in the present preferred embodiment, is integral with a transmission. The vehicle on which the antiskid apparatus according to the present preferred embodiment is mounted is, for example, a motorcycle, but the preferred embodiments of the present invention are not limited to motorcycles. A vehicle on which the antiskid apparatus according to the present preferred embodiment is mounted may be a saddle-riding type vehicle on which an operator gets on across the vehicle or a three-wheeled or four-wheeled saddle-riding type vehicle. First, an outline of the motorcycle on which an engine unit provided with a transmission according to the present preferred embodiment is mounted will be described.

As illustrated in FIG. 1, in motorcycle 10, head pipe 2 is provided on a front end side of main frame 1. Main frame 1 extends rearward and downward, with engine 8 including reciprocating engine body (hereinafter simply referred to as an "engine body") 6, transmission 7 and the like being enclosed by main frame 1. On head pipe 2, front fork 3 to which handle 5 is attached on an upper portion thereof is rotatably provided, and front wheel 4 rotatably attached at a lower end of front fork 3 is supported by front fork 3.

On handle 5, a shift switch (not shown) that causes transmission 7 of engine 8 to perform a shift change operation by an operation of the operator is provided. The shift switch includes a shift-up button and a shift-down button (not shown). By the operator pressing the shift-up button, transmission 7 performs a shift-up operation. By the operator pressing on the shift-down button, transmission 7 performs a shift-down operation.

At main frame 1, seat 9 and fuel tank 9a are arranged above engine 8. Between seat 9, fuel tank 9a, and engine 8, electronic control unit (ECU) 11 programmed to control operations of each section of motorcycle 10 is disposed. By ECU 11, an operation of transmission 7 to transmit power to a gear shift stage by a friction transmission type clutch is controlled with respect to one engine body 6.

Rear arm 12 is joined to extend rearward from a rear edge side portion of main frame 1 that extends obliquely downward. Rear arm 12 rotatably holds rear wheel (driving wheel) 13 and driven sprocket 15 around which drive chain 14 is wound.

Figure 2:
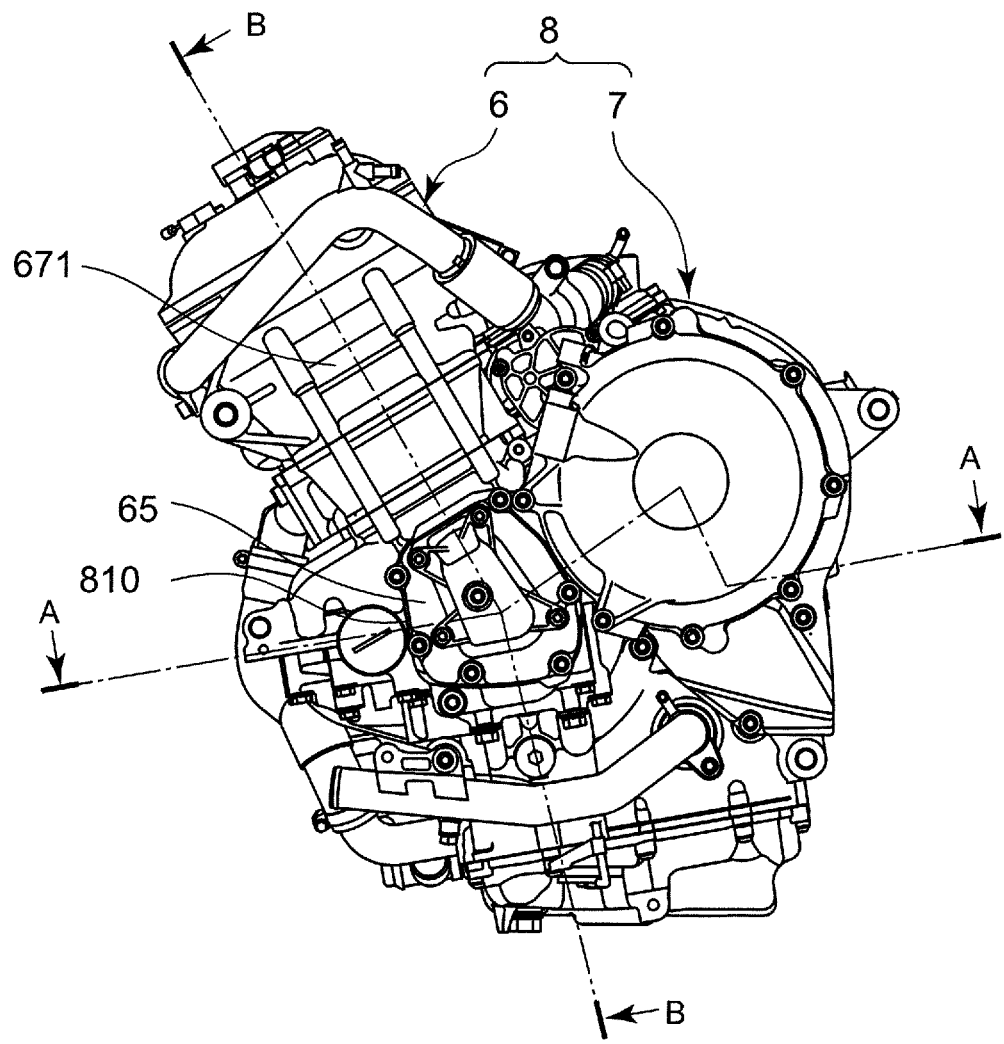
FIG. 2 is a left side view of a motorcycle engine in the motorcycle illustrated in FIG. 1.
Figure 3:
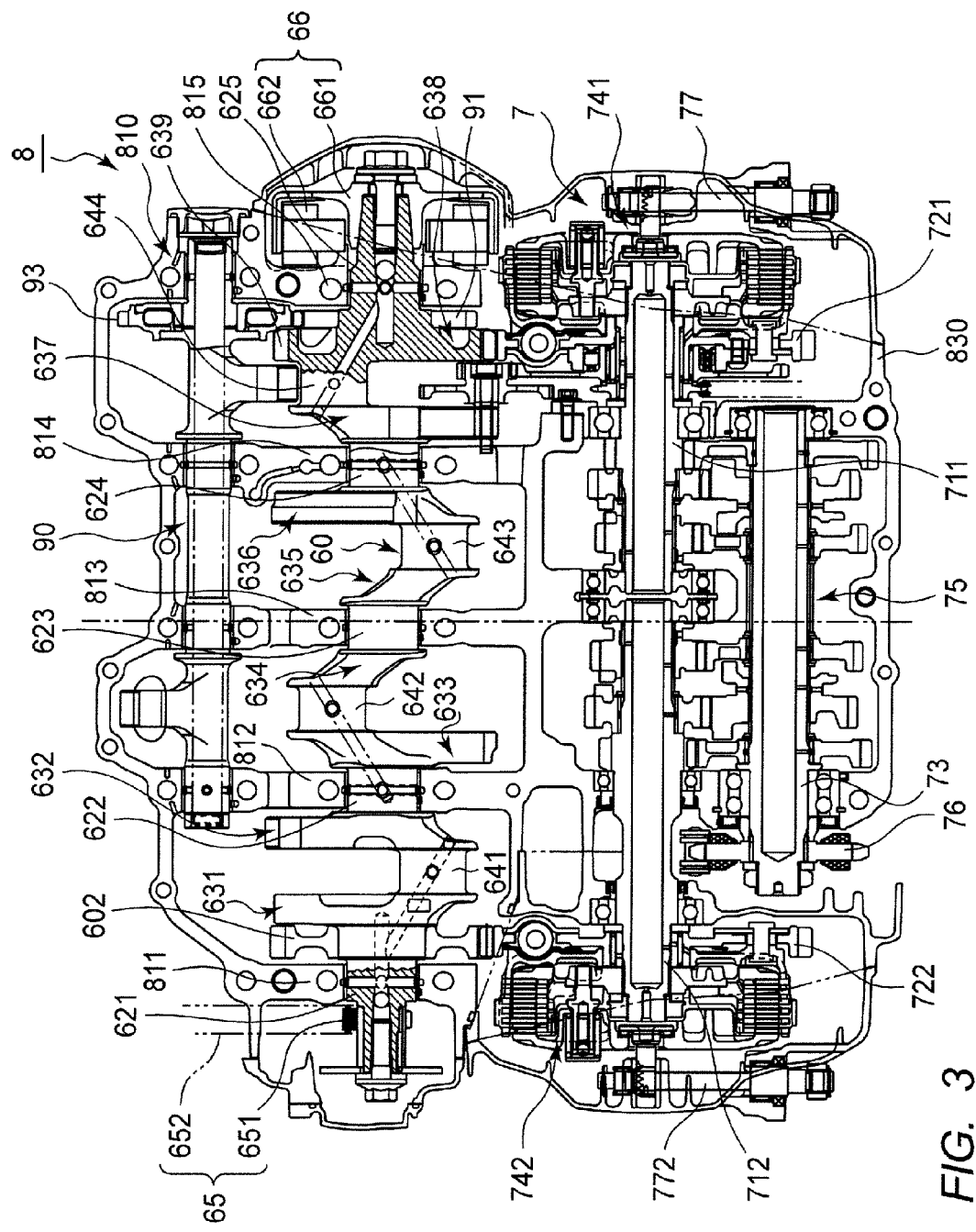
FIG. 3 is an axial sectional view of an engine unit taken along line A-A in FIG. 2.
Figure 4:
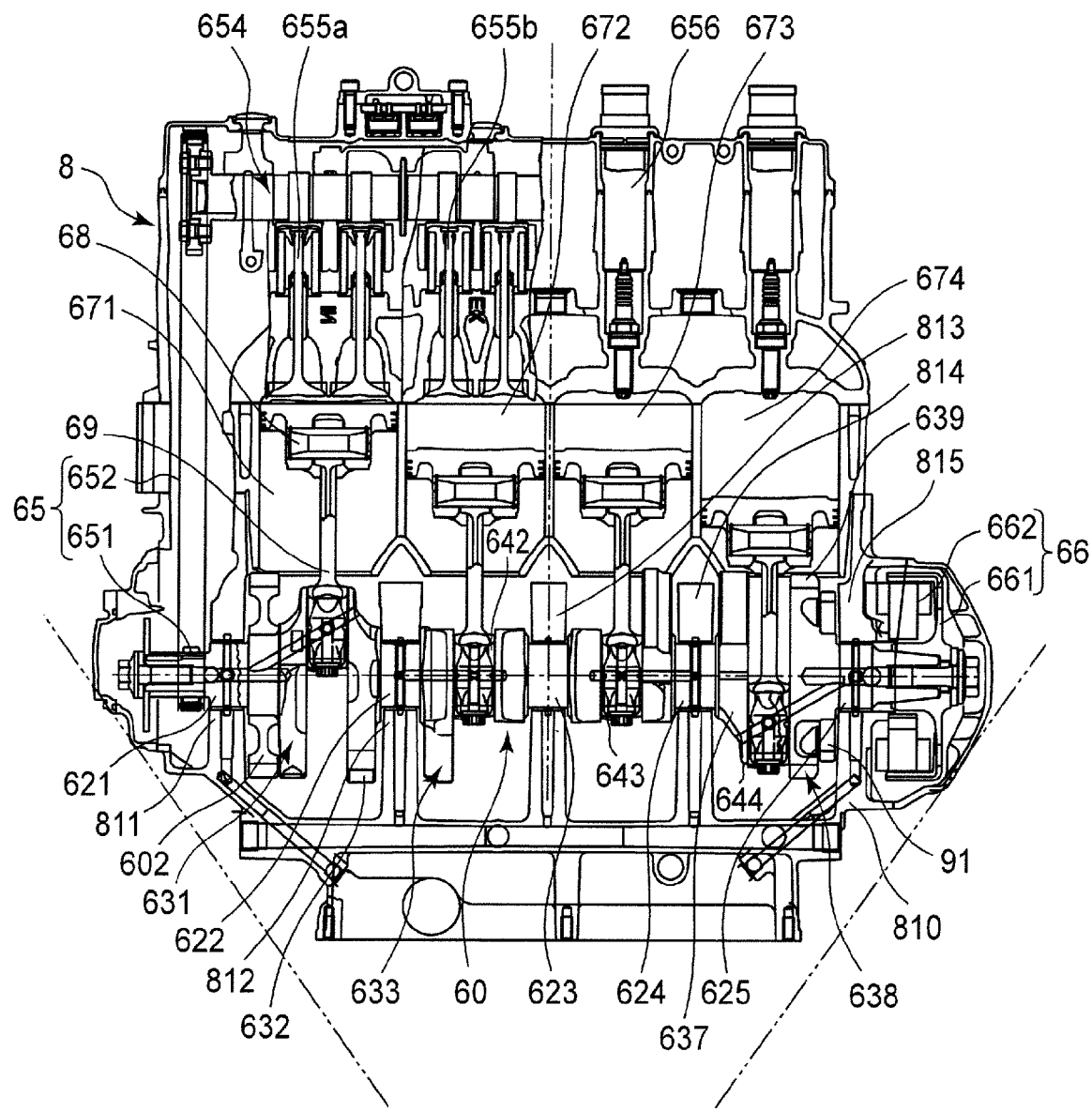
FIG. 4 is a cross-sectional view of the engine unit taken along line B-B in FIG. 2.

FIG. 2 is a left side view of the engine as a reciprocating internal combustion engine according to a preferred embodiment, FIG. 3 is an axial sectional view of the engine taken along line A-A in FIG. 2, and FIG. 4 is a cross-sectional view of the engine taken along line B-B in FIG. 2. FIG. 3 illustrates a crankshaft with connecting rods 69 (see FIG. 4) being not connected to crankpins 641, 642, 643, and 644 for convenience.

Engine 8, preferably a reciprocating internal combustion engine in the present preferred embodiment, includes engine body 6, transmission 7, and crankcase 810 and transmission case 830 to which engine body 6 and transmission 7 are attached.

Engine body 6 includes crankshaft 60, cam shaft driving section 65, and balance shaft 90 and is preferably integral with generator 66 and transmission 7 provided with a plurality of friction transmission type clutches 741 and 742.

Cam shaft driving section 65, generator 66, and balance shaft 90 are driven by rotation of crankshaft 60.

Crankshaft 60 extends horizontally or substantially horizontally in a direction (transverse direction) orthogonal to a longitudinal direction of the vehicle below a cylinder head in crankcase 810 of engine 8 and is rotatable. Hollow transmission case 830 is provided adjacent to crankcase 810, and transmission 7 is disposed in a region including crankcase 810 and transmission case 830.

Crankshaft 60 includes the plurality of crankpins 641 to 644 and has a moment. Specifically, crankshaft 60 is preferably a cross-plane type crankshaft, and the number corresponding to the number of cylinders or crankpins 641 to 644 (for example, four crankpins) are arranged in phases of 90 degrees to one another.

In engine body 6, as illustrated in FIG. 1 and FIG. 2, a cylinder is arranged in crankcase 810 (see FIG. 3 and FIG. 4) to accommodate crankshaft 60 in such a way that it protrudes obliquely upward toward the front. Here, the engine 6 is composed of four cylinders 671 to 674. Cylinders 671 to 674 are aligned along an extending direction of crankshaft 60 so that the center of alignment is located substantially at a center portion in the transverse direction of the vehicle or engine 8 as illustrated in FIG. 4.

Crankshaft 60 includes a plurality of counterweights (including a web and hereinafter referred to as "CW") 631 to 636, 637, 638. Crankshaft 60 is preferably formed by joining CW 631 to 636, 637, and 638 by five journals 621 to 625 and crankpins 641 to 644. Each of CW (including the web) 631 to 638 cancels an unbalanced force (unbalance) of a rotation balance in crankshaft 60. This unbalanced force of the rotation balance is caused by an inertia force generated by a reciprocal motion of piston 68 and connecting rod 69 in each of cylinders 671 to 674.

As illustrated in FIG. 4, crankpins 641 to 644 of crankshaft 60 are connected to pistons 68 in respective cylinders 671 to 674 through connecting rods 69.

Crankshaft 60 is rotatably attached to crankcase 810 in a state in which journals 621 to 625 are pivotally supported by journal receiving inner walls 811 to 815 in crankcase 810 rotatably through a bearing (metal).

Crankshaft 60 is disposed with the ends protruding to left and right from journal receiving inner walls 811 and 815 of crankcase 810.

Cam shaft driving section 65 is attached to one end (left side end) of crankshaft 60, and generator 66 is attached to the other end (right side end) of crankshaft 60. Cam shaft driving section 65 and generator 66 are each driven by the rotation of crankshaft 60.

In cam shaft driving section 65, the rotation of cam gear 651 fixed to the left side end of crankshaft 60 rotationally moves cam chain 652 (see FIG. 3 and FIG. 4).

Rotational movement of cam chain 652 rotates cam valve shaft 654 around which cam chain 652 is wound through a gear as illustrated in FIG. 4. As a result, in engine body 6, intake/exhaust valves (a cross-section corresponding to cross-section B-B in FIG. 2 is indicated by plugs 656 in two cylinders on a right side in the figure in FIG. 4, and cross-sections of two cylinders on a left side in the figure partially illustrates intake valves 655a and exhaust valve 655b) are driven by rotation of the cam of the cam shaft. Cam shaft driving section 65 is covered by a cam-shaft driving section cover (cam chain cover).

Generator 66 includes rotor 661 fixed to crankshaft 60 and rotating together with crankshaft 60 and stator 662 arranged on an inner periphery of rotor 661 and fixed to crankcase 810. Generator 66 is covered by a generator section cover. Preferably, generator 66 is a synchronous type AC motor (brushless DC motor) and is electrically connected to electricity control section 134 (FIG. 5) which will be described below.

On the other end side (right side) of crankshaft on which generator 66 is disposed, CW 638 located on the farthest one end side is provided, and gear (reduction small gear) 639 is provided on an outer periphery thereof. Gear 639 outputs rotational power of engine body 6, i.e., performs power take-off (PTO). Gear 639 of CW 638 is meshed with first reduction large gear 721 of first clutch 741 of transmission 7 and transmits the rotational power of engine 8 (specifically, the rotational power of engine body 6) from the one end (right end) side of crankshaft 60 to first reduction large gear 721. The rotational power transmitted to first reduction large gear 721 is output to first clutch 741 and transmitted to first main shaft 711 through first clutch 741.

On the one end side of crankshaft 60, balancer driving gear (hereinafter referred to as a "balance gear") 91 that transmits a rotary force to balance shaft 90 is fixed adjacent to CW 638 by press-fitting, for example. Balance gear 91 is meshed with balancer driven gear 93 of balance shaft 90. Balance shaft 90 is disposed parallel or substantially parallel to crankshaft 60. Balance shaft 90 functions as CW together with crankshaft 60. Balance shaft 90 is arranged in response to a couple of forces generated in crankshaft 60 and prevents this couple of forces from being transmitted to the vehicle as vibrations.

External gear (another gear) 602 including a gear groove provided on an outer periphery is press-fitted on the other end side (left side) of crankshaft 65 on which cam shaft driving section 65 is disposed, and external gear 602 is fixed at a position adjacent to CW 631.

External gear 602 has a function of outputting the rotational power of engine body 6 similarly to CW 638 and its gear 639, and its gear groove is similar to gear 639 of CW 638. Here, external gear 602 is meshed with second reduction large gear 722 of second clutch 742 and transmits the rotational power of engine body 6 to second reduction large gear 722 from the other end (left side end) side of crankshaft 60. The rotational power transmitted to second reduction large gear 722 is output to second clutch 742 and transmitted to second main shaft 712 of transmission 7 through second clutch 742.

As described above, the rotational power of engine 8 is transmitted to two clutches 741 and 742, respectively, of transmission 7 from both end sides of crankshaft 60.

Transmission 7 is preferably a dual-clutch type transmission and achieves power transmission of gear shift stages of odd-number stages and even-number stages by using a plurality of clutches, i.e., first clutch 741 and second clutch 742. As a result, when the rotational power of engine body 6 transmitted from crankshaft 60 is varied and transmitted to rear wheel 13, a seamless shift change in power transmission (change of gear shift stages) is achieved.

Transmission 7 is provided in transmission case 830 on the rear of the engine so that a substantial center over the entire width in the transverse direction of transmission 7 and a center in the transverse direction of motorcycle 10, i.e., a center surface of the vehicle are aligned with each other or are brought close to each other. The center surface of the vehicle is a perpendicular or substantially perpendicular surface passing through a vehicle center line in a state in which the vehicle is standing perpendicularly or substantially perpendicularly to a horizontal surface.

Moreover, transmission 7 includes first main shaft 711, second main shaft 712, first reduction large gear 721, second reduction large gear 722, drive shaft 73, first clutch 741, second clutch 742, and shift gear group 75.

First main shaft 711, second main shaft 712, and drive shaft 73 are rotatably arranged in transmission case 830 parallel or substantially parallel to crankshaft 60 arranged substantially horizontally in a direction orthogonal to the vehicle. First main shaft 711 and second main shaft 712 have the same outer diameter and are juxtaposed right and left on the same axis and rotate independently of each other. First clutch 741 and second clutch 742 are arranged on the left and right sides of the vehicle, respectively, so as to sandwich the first main shaft 711 and second main shaft 712.

Specifically, first and second main shafts 711 and 712 are arranged so as to face the respective tip ends with each other at substantially the center in transmission case 830 and to protrude respective base ends towards the right and left from both side directions of transmission case 830.

First clutch 741 is connected to the base end of first main shaft 711 protruding from one side (right side) of transmission case 830.

Second clutch 742 is connected to the base end of second main shaft 712 protruding from the other side (left side) of transmission case 830.

First clutch 741 disengages or engages the rotational power of engine body 6 transmitted from crankshaft 60 to first main shaft 711.

First reduction large gear 721 and a clutch outer of first clutch 741 integral with first reduction large gear 721 are provided rotatably around an outer periphery of first main shaft 711. First clutch 741 includes the clutch outer and a clutch inner arranged inside the clutch outer and opened (disengaged) from/fastened (engaged) with the clutch outer. The clutch inner is fixed to the base end (right side end) of first main shaft 711. First clutch 741 disengages or engages the rotational power of engine body 6 by opening/fastening the clutch outer and clutch inner. First clutch 741 is connected to pull rod 77 of a first clutch actuator (not shown). Specifically, when a pressure plate is pulled by pull rod 77, the clutch outer of first clutch 741 is separated from the clutch inner. First clutch 741 has its operation controlled by ECU 11 (see FIG. 1) through the first clutch actuator (not shown). First clutch 741 outputs the rotational power to drive shaft 73 through odd-number shift gear stages (first, third, and fifth) disposed across first main shaft 711 and drive shaft 73 in shift gear group 75. Drive shaft 73 transmits the rotational power to rear wheel 13 through drive sprocket 76, drive chain 14, and driven sprocket 15. Shift gear group 75 includes gear shift stages (first to sixth), and gear-shift is performed by a shift mechanism (not shown).

Second clutch 742 disengages or engages the rotational power of engine body 6 transmitted from crankshaft 60 to second main shaft 712 through second reduction large gear 722. Second clutch 742 is symmetrical with respect to first clutch 741. Second reduction large gear 722 and a clutch outer of second clutch 742 integral with second reduction large gear 722 are provided rotatably around an outer periphery of second main shaft 712. Second clutch 742 includes the clutch outer and a clutch inner arranged inside the clutch outer and opened (disengaged) from/fastened (engaged) with the clutch outer. The clutch inner is fixed to the base end (left side end) of second main shaft 712. Second clutch 742 disengages or engages the rotational power of engine body 6 by opening/fastening the clutch outer and clutch inner. Second clutch 742 is connected to pull rod 772 of a second clutch actuator (not shown). Specifically, in second clutch 742, when a pressure plate is pulled by pull rod 772, the clutch outer is separated from the clutch inner. Second clutch 742 has its operation controlled by ECU 11 (see FIG. 1) through the second clutch actuator (not shown). Second clutch 742 outputs the rotational power to drive shaft 73 through even-number shift gear stages (second, fourth, and sixth) disposed across second main shaft 712 and drive shaft 73 in shift gear group 75. Drive shaft 73 transmits the rotational power to rear wheel 13 through drive sprocket 76, drive chain 14, and driven sprocket 15.

Gear shift of each gear of shift gear group 75 is performed by a shift fork movable by rotation of a shift cam in the shift mechanism (not shown). The shift fork performs gear shift by moving each spline gear in an axial direction in shift gear group 75 of transmission 7. The shift mechanism has its operation controlled by ECU 11 (see FIG. 1) similarly to first clutch 741 and second clutch 742. First clutch 741, second clutch 742, and the shift mechanism perform disengaging/engaging operations of first clutch 741 and second clutch 742 and power transmission through each gear in the gear shift stage corresponding to the disengaging/engaging operations on the basis of an input of a shift change.

The motorcycle 10 provided with the antiskid apparatus has been described above. Subsequently, a configuration and a function of the antiskid apparatus in a control system of motorcycle 10 will be described.

Figure 5:
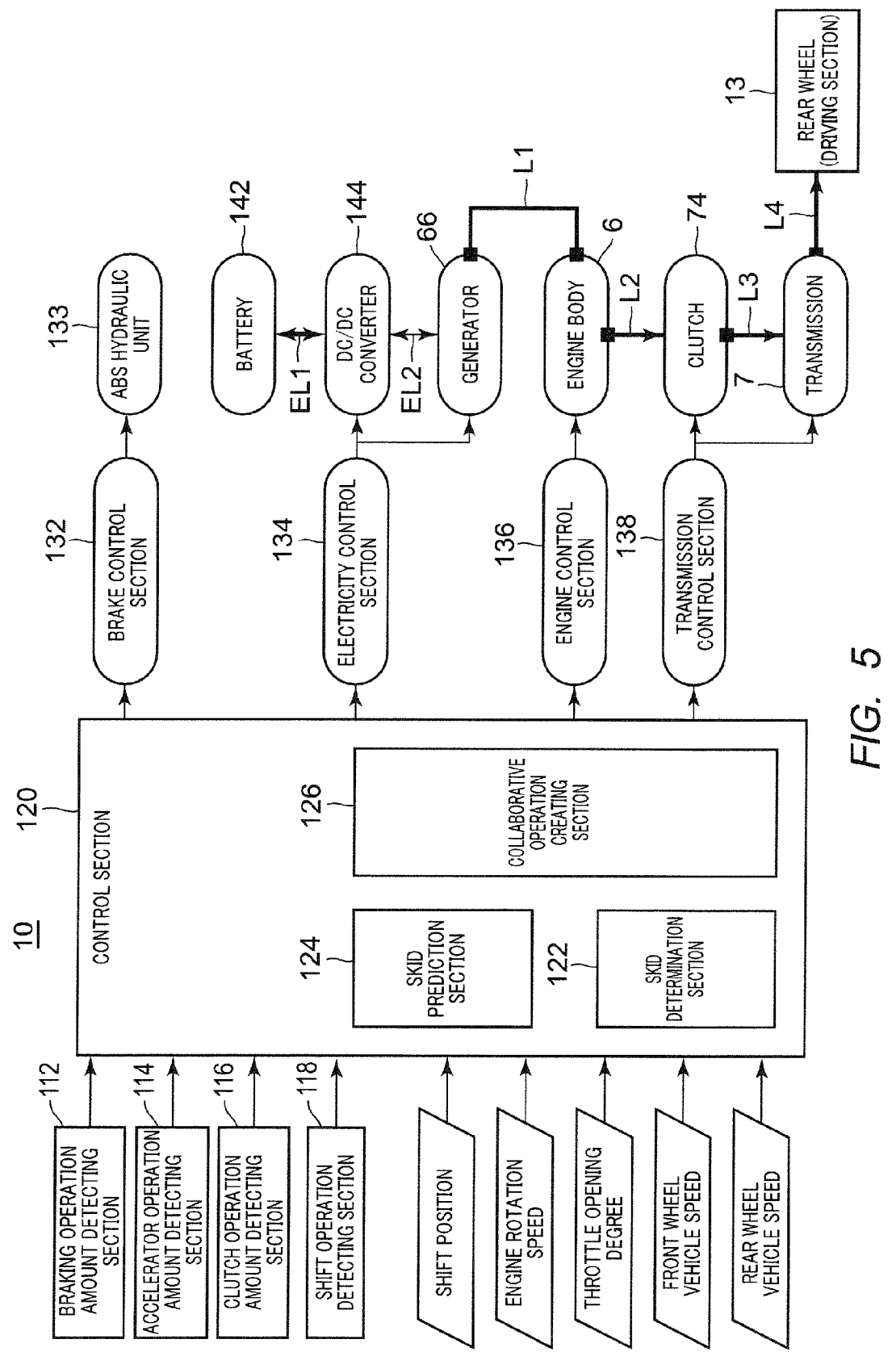
FIG. 5 is a block diagram illustrating a control section of the motorcycle including the antiskid apparatus according to a preferred embodiment of the present invention.

FIG. 5 is a block diagram illustrating a control system of a motorcycle for explaining an antiskid apparatus according to a first preferred embodiment of the present invention. In FIG. 5, bold lines L1 to L4 indicate mechanically engaged power paths and both arrow lines EL1 and EL2 indicate paths of electrically connected electric power.

The antiskid apparatus in motorcycle 10 includes braking operation amount detecting section 112, accelerator operation amount detecting section 114, clutch operation amount detecting section 116, shift operation detecting section 118, control section 120, brake control section 132, electricity control section 134, engine control section 136, and transmission control section 138.

Braking operation amount detecting section 112 detects a braking operation amount by the driver and outputs information indicating the braking operation amount to control section 120.

Accelerator operation amount detecting section 114 detects an accelerator operation amount by the operator and outputs information indicating the accelerator operation amount to control section 120.

Clutch operation amount detecting section 116 detects a clutch operation amount by the operator and outputs information indicating the clutch operation amount to control section 120.

Shift operation detecting section 118 detects a shift operation and outputs the detected information, i.e., information indicating a shift change instruction (request) of the operator to control section 120.

Into control section 120, in addition to information input from each of sections 112, 114, 116, and 118, information of each of a shift position, an engine rotation speed, a throttle opening degree, a front wheel vehicle speed, and a rear wheel vehicle speed is input from each sensor (not shown). The shift position information is input into control section 120 from a phase angle sensor that detects a phase angle of the shift cam. The engine rotation speed is input into control section 120 from a sensor that detects a rotation speed of crankshaft 60. Moreover, throttle opening degree, front wheel vehicle speed, and rear wheel vehicle speed are input into control section 120 from sensors that detect throttle opening degree, front wheel rotation speed, and rear wheel rotation speed, respectively.

Control section 120 controls each of the elements of the entire motorcycle 10 including driving of motorcycle 10 on the basis of the input information. Control section 120 creates a control instruction that collaborates operating brake control section 132, electricity control section 134, engine control section 136, and transmission control section 138. Control section 120 controls each of brake control section 132, electricity control section 134, engine control section 136, and transmission control section 138 by the created control instruction.

On the other hand, information indicating a control state of a brake from brake control section 132 and information indicating a remaining amount of electricity of battery 142 and a control state of generator 66 from electricity control section 134 are transmitted to control section 120. In addition, information indicating a control state of engine body 6 from engine control section 136 and information indicating an engagement status of transmission (specifically, shift gear stages and two clutches) from transmission control section 138 are transmitted to control section 120. Using the input information, control section 120 drives rear wheel 13, a driving wheel, by either one of or both of engine body 6 and generator 66 or drives generator 66 to perform regenerative braking while grasping a state of the vehicle all the time.

As described above, control section 120 executes control by switching a control target to at least either one of both the engine and the motor depending on a driving state and the remaining amount of electricity in battery 142 to be charged by the generator and also controls a driving force including a deceleration force in the driving wheel together with the engine control.

As one of such control, control section 120 executes an antiskid process during acceleration and deceleration by controlling brake control section 132, electricity control section 134, engine control section 136, and transmission control section 138 on the basis of the input information.

In the antiskid process, control section 120 monitors, on the basis of the input information, the front wheel vehicle speed and rear wheel vehicle speed, acceleration including negative (so-called deceleration), torques output by the engine and the generator, shift gear stages and the connection between the two clutches. By monitoring them, control section 120 executes control of generator 66 through electricity control section 134.

As the antiskid process, during rapid deceleration when deceleration speed of the vehicle becomes a speed at a predetermined value or more or during deceleration associated with shift down through the transmission, control section 120 instructs electricity control section 134 to decrease the generated amount of power from generator 66 when the engine rotation speed is higher than a predetermined rotation speed. Then, in engine body 6, a generation load in generator 66, i.e., a negative torque generated in generator 66 becomes small. As a result, a deceleration torque (engine brake) transmitted from engine body 6 to rear wheel (driving wheel) 13 is reduced. As a result, control section 120 prevents the occurrence of skid in rear wheel 13 or restores grip of rear wheel 13.

Moreover, as the antiskid process, during rapid deceleration when deceleration speed of the vehicle becomes a speed at a predetermined value or more or during deceleration associated with shift-down through the transmission, control section 120 instructs electricity control section 134 to assist/drive crankshaft 60 by generator 66 when the engine rotation speed is higher than a predetermined rotation speed. Upon receipt of the instruction, electricity control section 134 supplies electricity from battery 142 to generator 66 through DC/DC converter 144 and assists/drives crankshaft 60 by a positive torque generated by generator 66. As a result, the deceleration torque (engine brake) transmitted from engine body 6 to rear wheel 13 is further reduced. As a result, control section 120 prevents skidding by rear wheel 13 or rapidly restores grip of rear wheel 13.

As described above, during rapid deceleration when deceleration speed of the vehicle becomes a speed at a predetermined value or more or during deceleration associated with shift-down through the transmission, control section 120 controls generator 66 and changes an operation of decreasing the generated amount of power from generator 66 to an operation of assisting driving of crankshaft 60. As a result, the deceleration torque of rear wheel 13 is adjusted as described above.

In the present preferred embodiment, control section 120 includes skid determination section 122, skid prediction section 124, and collaborative operation creating section 126.

Skid determination section 122 determines whether or not rear wheel 13, the driving wheel, is slipping, i.e., skidding, on the basis of input information (information indicating acceleration/deceleration and wheel rotation speeds, respectively, for example). Specifically, skid determination section 122 determines that rear wheel 13 is skidding after its occurrence and controls each section so as to restore grip ability. In other words, skid determination section 122 executes the antiskid proceeding as passive control. Specifically, in skid determination section 122, adaptation values are set as a table in advance as skid determination values (threshold values) to make determinations of a skid state by a bank angle, a vehicle speed and the like.

Skid determination section 122 determines that the current driving state of rear wheel 13 is a skid state by comparing the adaptation values in the table with the input information.

The bank angle is configured to be calculated by control section 120 by using input front wheel rotation speed and rear wheel rotation speed, but preferred embodiments of the present invention are not limited thereto, and an inclination angle sensor that detects an inclination angle of the vehicle body may be used. In this case, since the bank angle is detected by the inclination angle sensor, the effect similar to the calculation by using the front wheel rotation speed and rear wheel rotation speed is obtained.

Specifically, skid determination section 122 compares a skid determination value (adaptation value) used as a threshold value with a skid state value expressing the above described skid state and determines whether or not rear wheel 13 is in a skid occurring state. Specifically, the skid state value indicates a state value expressing the current skid state in the vehicle. Skid determination section 122 detects slip of rear wheel 13 during deceleration of the vehicle and controls generator 66 and drives engine body 6 so that the deceleration torque generated in rear wheel 13 is reduced.

Skid prediction section 124 predicts, on the basis of the input information, whether or not rear wheel 13, the driving wheel, is likely to slip. Skid prediction section 124 is used to actively control (active control) each section so as to avoid skidding before it occurs if continuation of the current driving state would lead to skidding. Specifically, skid prediction section 124 predictively causes an operation of avoiding skidding on the basis of the driving state.

Skid prediction section 124 calculates a state value (skid allowance value) expressing allowance until occurrence of skid from the current driving situation by using information on the input driving state of the vehicle and an operation of the operator and specification information of the vehicle (also referred to as "vehicle specification") stored in advance in control section 120. Here, the allowance is a range until skid occurs in rear wheel 13 and a range of values which maintain grip of rear wheel 13.

Here, skid prediction section 124 calculates a slip limit thrust of rear wheel 13 from the input information indicating the driving state of the vehicle. Skid prediction section 124 calculates an engine torque from an engine rotation speed and throttle opening degree. Moreover, skid prediction section 124 calculates a driving or regenerative torque generated in generator 66 from the control state information of generator 66 provided by electricity control section 134 to control section 120. Moreover, skid prediction section 124 refers to the vehicle specification stored in advance in control section 120. Here, the vehicle specification includes a primary deceleration ratio (gear ratios between first reduction large gear 721 and first reduction small gear 639 and between second reduction large gear 722 and external gear 602), a secondary deceleration ratio (gear ratio between driven sprocket 15 and drive sprocket 76), a gear ratio corresponding to a shift position (so-called gear position), and an effective radius of rear wheel 13. On the basis of the slip limit thrust, the engine torque, the driving or regenerative torque in generator 66, and the vehicle specification, skid prediction section 124 calculates a driving force currently transmitted from engine body 6 to rear wheel 13 as a driving torque and acting in rear wheel 13.

Skid prediction section 124 calculates front wheel acceleration from the front wheel rotation speed and rear wheel acceleration from the rear wheel rotation speed (vehicle speed). Furthermore, by calculating and comparing driving resistance by referring to the front wheel acceleration and the rear wheel acceleration, the above described driving force acting on rear wheel 13, and the vehicle specification stored in advance in control section 120, skid prediction section 124 calculates a braking force by a brake acting on front wheel 4 and rear wheel 13. Here, a force acting on rear wheel 13 is a sum (rear wheel thrust) of the above described driving force and a rear wheel braking force.

Skid prediction section 124 refers to the information relating to a wheelbase of the vehicle, a position of center of gravity (front and rear, right and left, height) with respect to the wheelbase, and displacement characteristics of a suspension apparatus from the vehicle specification stored in advance in control section 120. By referring to them, skid prediction section 124 estimates a front wheel load and a rear wheel load from a front wheel braking force acting on front wheel 4 and a total sum of the driving force and the rear wheel braking force acting on rear wheel 13 (rear wheel thrust) and calculates the slip limit thrust of rear wheel 13 by using the rear wheel load and a road surface µ.

Skid prediction section 124 compares the rear wheel thrust (more accurately, since the braking force is a negative value, an absolute value is used in the calculation) with the slip limit thrust.

Skid prediction section 124 determines that there is skid allowance if the slip limit thrust is larger, while it determines that there is no skid allowance, i.e., skidding can easily occur if the rear wheel thrust is larger.

Moreover, skid prediction section 124 detects a state where, for example, the skid limit thrust of rear wheel 13 runs short of the driving force, and determines, when such a state has been detected, that skidding is likely to occur.

Here, skid prediction section 124 compares the slip limit thrust and driving force of rear wheel 13 (see FIG. 1) at that time which is calculated from the road surface µ acquired by skid determination section 122 and stored with the slip limit thrust and braking force of rear wheel 13 (see FIG. 1) at that time. As the road surface µ, a value acquired from skidding having occurred in front wheel 4 and stored may be used.

Collaborative operation creating section 126 creates a collaborative operation of control of the brake, the motor, and the engine on the basis of the information input from skid determination section 122 and skid prediction section 124. The created operation is output as an instruction value to brake control section 132, electricity control section 134, engine control section 136, and transmission control section 138. Moreover, brake control section 132, electricity control section 134, engine control section 136, and transmission control section 138 sequentially transmit information indicating the respective control effective values (effectiveness of the instruction) or states to control section 120.

Brake control section 132 reduces sliding of the wheel caused by braking when driving on a low-friction road surface through antilock brake system (ABS) hydraulic unit 133 on the basis of the instruction value input from control section 120.

Electricity control section 134 controls a current and a voltage of generator 66 on the basis of the instruction value input from control section 120. Electricity control section 134 controls a current and a voltage of generator 66 including electricity to be output from battery 142 to generator 66 through DC/DC converter 144 and electricity regenerated in battery 142 from generator 66 through DC/DC converter 144. Moreover, electricity control section 134 monitors input/output and the remaining amount of electricity of battery 142.

Engine control section 136 performs control relating to an operation of engine body 6. Engine control section 136 controls operations such as an intake air amount by a throttle valve, fuel injection by an injector, ignition by an ignition plug and the like in a direct manner on the basis of the instruction value input from control section 120. In addition, engine control section 136 controls a torque generated in engine body 6 in an indirect manner on the basis of the instruction value input from control section 120.

Transmission control section 138 controls a shift change of transmission 7 on the basis of the control instruction input from control section 120 (specifically controls shift change by disengagement/engagement control of the two clutches and the shift mechanism) and outputs the driving force to rear wheel 13 which is the driving wheel.

Figure 6:
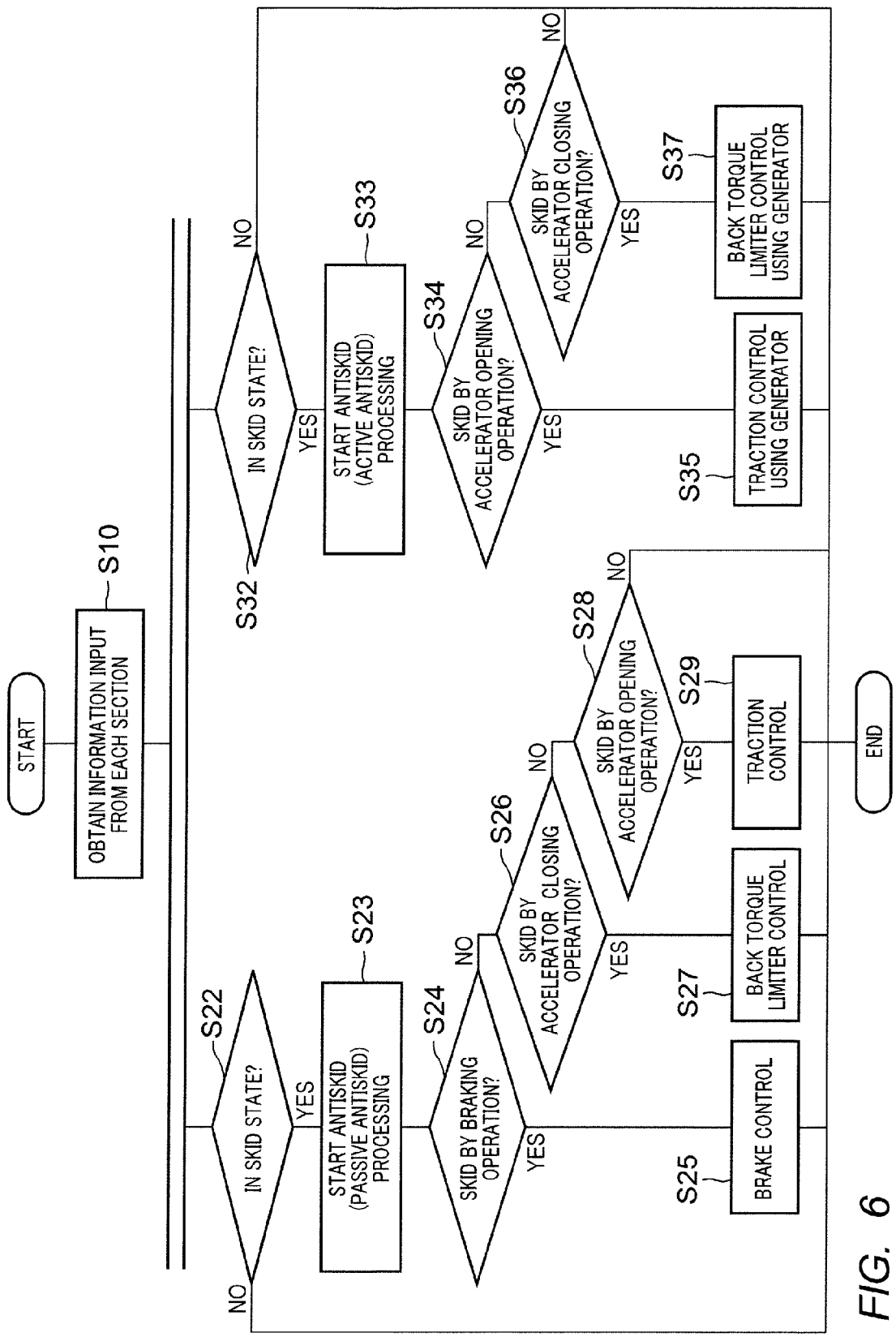
FIG. 6 is a flowchart for explaining an operation by the antiskid apparatus provided in the motorcycle.

Subsequently, referring to FIGS. 5 to 7, control of the antiskid apparatus in motorcycle 10 will be described. FIG. 6 is a flowchart illustrating control of the antiskid apparatus. FIG. 7 is a diagram illustrating correspondence between operation of the antiskid apparatus and each section and illustrates each section executing processes in the flowchart illustrated in FIG. 6, functions of each section, and the control sections and elements subjected to the functions. Specifically, an operation target control section and a control element at that time in the collaborative operation created by control section 120 in the antiskid process illustrated in FIG. 6 are illustrated, and if the control section or the element operates mainly in the collaborative operation, it is indicated by "A" and if the operation is assistive in nature, it is indicated by "B." Moreover, the term "preparation" indicates that a preparation operation is to be performed, and "restricted" indicates that the operation is restricted.

When control by ECU 11 in motorcycle 10 is started, or specifically, when motorcycle 10 starts driving from ignition, information relating to the driving of motorcycle 10 is input to the antiskid apparatus including a portion of ECU 11 from each section mounted on motorcycle 10.

Step S10 is a process performed by control section 120, and at Step S10, the following information is input into ECU 11 and control section 120 of the antiskid apparatus all the time.

As illustrated in FIG. 5, control section 120 receives a front wheel rotation speed ("front wheel vehicle speed") from a front wheel rotation speed sensor (front wheel rotation speed detecting section), and a rear wheel rotation speed ("rear wheel vehicle speed") from a vehicle speed sensor (rear wheel rotation speed detecting section). Moreover, control section 120 receives a rotation speed of the crankshaft from an engine rotation speed sensor that detects a rotation speed of crankshaft 60, i.e., receives an "engine rotation speed". Control section 120 receives "throttle opening degree" from a throttle opening sensor that detects a throttle valve opening. Furthermore, into control section 120, a signal is input from a phase angle sensor that detects a phase angle of the shift cam. In control section 120, the "shift position (i.e., a gear position)" is determined on the basis of the signal from the phase angle sensor (indicated by the "shift position" in FIG. 5) that detects the phase angle of the shift cam.

Control section 120 receives a shift request from shift operation detecting section 118, and an accelerator operation amount from accelerator operation amount detecting section 114. Furthermore, control section 120 receives a brake operation amount from brake operation amount detecting section 112, and a clutch operation amount from clutch operation amount detecting section 116.

The antiskid apparatus (in detail, control section 120) calculates the bank angle by using the input front wheel rotation speed and rear wheel rotation speed and calculates an engine torque by using the engine rotation speed and the throttle opening degree. At the same time, by referring to the control state of generator 66, a generator torque is calculated, and a crank torque output as the driving force from the crankshaft is calculated. Moreover, the antiskid apparatus refers to the gear ratio corresponding to the shift position (gear position) determined from the phase angle of the shift cam and stored in advance as a specification value of the vehicle. The antiskid apparatus calculates a driving shaft (shaft of rear wheel 13) torque by using the crank torque and the gear ratio.

Control section 120 performs skid determination and prediction at Step S10 and after, i.e., at Steps S22 and S23 and after in skid determination section 122 and skid prediction section 124 at the same time.

Specifically, when skidding has occurred, control section 120 executes the antiskid process using skid determination section 122 on the basis of the input information, predicts the occurrence of skidding using skid prediction section 124 and executes the antiskid process before skidding occurs.

Moreover, control section 120 operates each of the control elements (specifically, brake control section 132, electricity control section 134, engine control section 136, and transmission control section 138) by collaborative operation creating section 126 on the basis of the skid determination and prediction by skid determination section 122 and skid prediction section 124 in a collaborative manner, creates a collaborative operation so that occurrence of skid is avoided or grip is rapidly restored, and instructs it to each of the control elements as a control instruction value.

Step S22 is a process performed by skid determination section 122 of control section 120. At Step S22, skid determination section 122 makes a skid determination of whether or not the vehicle is in a skid state on the basis of the input information. Specifically, skid determination section 122 calculates a state value (skid state value) expressing the current skid state from the front wheel acceleration and rear wheel acceleration calculated by using the input front wheel rotation speed and rear wheel rotation speed and the bank angle and compares the state value with a table threshold value stored in advance as an adaptation value of the skid determination. As a result, if the state value (skid state value) expressing the current skid state does not match the adaptation value, i.e., if the state value exceeds a skid determination value set in advance, the vehicle is determined to be skidding (skid state), and the routine proceeds to Step S23. Alternatively, in the process at Step S22, if the vehicle is not determined to be in the skid state, the process is finished. After this process is finished, the routine returns to Step S10, and this series of processes is repeatedly executed during driving of motorcycle 10.

Step S23 is a process performed by collaborative operation creating section 126 of control section 120. At Step S23, collaborative operation creating section 126 starts a passive antiskid process to the skid state which has already occurred in order to exit the skid state (restore grip state) on the basis of the determination of skid determination section 122. Moreover, at Step S23, collaborative operation creating section 126 starts a "restricted operation mode" before a factor causing skidding is identified at Step S24, Step S26, and Step S28, which will be described later. This "restricted operation mode" is a mode in which driving control of ABS hydraulic unit 133, engine body 6, generator 66, transmission 7 and the like is restricted.

Here, at Step S23, if the "restricted operation mode" is started by collaborative operation creating section 126, even if a shift change instruction is input in shift operation detecting section 118, for example, a shift change operation of transmission 7 is prohibited. Moreover, if the "restricted operation mode" is started, an operation of the throttle is controlled to become sluggish in an accelerator operation input in accelerator operation amount detecting section 114 as compared with a case in which skidding is not determined. Moreover, if the "restricted operation mode" is started, generator 66 having performed driving or regeneration has its output torque restricted. Furthermore, if the "restricted operation mode" is started, an antilock braking operation of the ABS hydraulic unit is prepared by starting a pressure rise of standby hydraulic pressure in ABS hydraulic unit 133.

Step S24 is a process performed by skid determination section 122. At Step S24, skid determination section 122 determines, on the basis of the input information, whether or not skidding is being caused by a braking operation. If it is determined that skidding is being caused by a braking operation, the routine proceeds to Step S25. If it is determined that skidding is not being caused by a braking operation, the routine proceeds to Step S26.

Step S25 is a process performed by collaborative operation creating section 126. At Step S25, collaborative operation creating section 126 of control section 120 mainly instructs brake control section 132 (see FIG. 5) and performs a passive antilock braking operation on the basis of the determination result at Step S24.

Specifically, at Step S25, collaborative operation creating section 126 creates and outputs a control instruction value to brake control section 132 so that the grip of the wheel is restored. Brake control section 132 (see FIG. 5) receives the control instruction value and performs the antilock braking operation of the brake by controlling driving of the brake through ABS hydraulic unit 133 (see FIG. 5). Specifically, by reducing the braking degree by the braking operation during the skid state by the braking operation, an operation of reducing the braking force generated by the braking operation to a level smaller than a frictional force generated between the road surface and the wheel (front wheel 4 and/or driving wheel (rear wheel) 13) is repeated. As a result, a state in which the frictional force between the wheel and the road surface exceeds the braking force is ensured, so that grip of the wheel (front wheel 4 and/or rear wheel 13) is restored.

At Step S25, collaborative operation creating section 126 illustrated in FIG. 5 creates a control instruction value to operate generator 66, DC/DC converter 144, and the throttle valve of engine 8 (engine body 6) in a collaborative manner so as to assist the antilock braking operation of the brake and drives each of them. Collaborative operation creating section 126 drives generator 66 and DC/DC converter 144 through electricity control section 134 and drives the throttle valve of engine 8 (engine body 6) through engine control section 136. Moreover, at Step S25, collaborative operation creating section 126 controls clutch disengagement/engagement of transmission 7 and restricts a shift change to transmission control section 138. At Step S25, the grip of the wheel is rapidly restored by the collaborative operation created by collaborative operation creating section 126, and the process is finished.

Step S26 is a process performed by skid determination section 122. At Step S26, skid determination section 122 determines whether or not there is skidding by an accelerator closing operation on the basis of the input information. If it is determined at Step S26 that skidding is caused by the accelerator closing operation, the routine proceeds to Step S27. If it is determined that skidding is not caused by the accelerator closing operation, the routine proceeds to Step S28.

Step S27 is a process performed by collaborative operation creating section 126. At Step S27, collaborative operation creating section 126 in control section 120 performs a back torque limiter control operation which is a passive antiskid process by mainly instructing transmission control section 138 on the basis of the determination result at Step S26.

Specifically, at Step S27, collaborative operation creating section 126 limits a torque transmission capacity of first and second clutches (741, 742) in transmission 7. As a result, an operation (back torque limiter operation) of reducing a back torque transmitted from engine body 6 (in detail, crankshaft 60) to driving wheel (rear wheel) 13 and acting as a deceleration force (engine brake) to a state smaller than the frictional force generated between the road surface and the wheel (rear wheel 13) is performed. As a result, a state in which the frictional force between the wheel and the road surface exceeds the deceleration force (corresponding to the back torque) is ensured, so that the grip of the wheel is restored.

Moreover, at Step S27, collaborative operation creating section 126 creates control instruction values to operate generator 66 and DC/DC converter 144 through electricity control section 134 and the throttle valve through engine control section 136 in a collaborative manner so as to assist the back torque limiter control operation of the clutch. In addition, collaborative operation creating section 126 outputs the created control instruction values to electricity control section 134 and engine control section 136 so as to drive generator 66, DC/DC converter 144, and the throttle valve, respectively. Collaborative operation creating section 126 assists the back torque limiter control operation of the clutch through driving of generator 66, DC/DC converter 144, and the throttle valve. As described above, at Step S27, the grip of the wheel is rapidly restored by the collaborative operations created by collaborative operation creating section 126, and the process is finished.

Step S28 is a process performed by skid determination section 122. At Step S28, skid determination section 122 determines whether or not skidding is caused by the accelerator opening operation on the basis of the input information, and if it is determined that skidding is caused by the accelerator opening operation, the routine proceeds to Step S29, while if it is determined that skidding is not caused by the accelerator opening operation, the process is finished. After this process is finished, the routine returns to Step S10, and the series of processes is repeatedly executed during driving of motorcycle 10.

Step S29 is a process performed by collaborative operation creating section 126 of control section 120. At Step S29, collaborative operation creating section 126 performs a traction control operation which is the passive antiskid process by mainly instructing engine control section 136 on the basis of a determination result at Step S28.

Specifically, at Step S29, collaborative operation creating section 126 performs the traction control operation of reducing an acceleration force (driving force) to a state smaller than the frictional force generated between the road surface and the wheel (here, rear wheel 13 which is the driving wheel) by limiting the engine torque transmitted from engine body 6 (in detail, crankshaft 60) to rear wheel (driving wheel) 13 and acting as the acceleration force. As a result, a state in which the frictional force between the wheel (rear wheel 13) and the road surface exceeds the acceleration force is ensured, so that the grip of the wheel is restored. In other words, at Step S29, engine control section 136 controls the throttle valve opening and ignition upon receipt of the instruction of the traction control operation instructed by collaborative operation creating section 126 and performs the traction control operation of reducing the engine torque to be transmitted to the wheel (rear wheel 13) from engine body 6.

Moreover, at Step S29, collaborative operation creating section 126 creates a control instruction value for collaborative operation and sends it to electricity control section 134 and transmission control section 138 so as to assist the traction control operation by engine control section 136, respectively. As a result, electricity control section 134 controls generator 66 and DC/DC converter 144, increases a generation load to generator 66, i.e., decreases the engine torque to be transmitted from engine body 6 to wheel (rear wheel which is the driving wheel) 13, and assists the traction control operation. Moreover, transmission control section 138 restricts clutch disengagement/engagement or shift change of transmission 7 on the basis of the instruction from collaborative operation creating section 126. At Step S29, the acceleration force in the wheel (rear wheel 13 which is the driving wheel) is reduced by the collaborative operations created by collaborative operation creating section 126, the grip of the wheel (rear wheel 13) is rapidly restored, and the process is finished.

On the other hand, control section 120 executes the above described passive antiskid process by using the function including skid determination section 122 (see FIG. 5) and executes an active antiskid process by using skid prediction section 124 (see FIG. 5).

Step S32 is a process performed by skid prediction section 124 of control section 120. At Step S32, skid prediction section 124 of control section 120 predicts and determines whether or not there is a possibility of skidding, i.e., whether or not a skid state is imminent before entering a skid state (i.e., makes skid prediction determination).

Specifically, skid prediction section 124 calculates a state value (skid allowance value) expressing allowance until occurrence of skid from the current driving situation by using information on the input driving state of the vehicle and an operation of the operator and vehicle specification stored in advance in control section 120. Skid prediction section 124 compares the calculated skid allowance value with the adaptation value to be a determination value of skid occurrence prediction stored in advance. Skid occurrence is predicted by this comparison, and the antiskid process is executed.

The adaptation value used in skid prediction section 124 is a value indicating the slip limit thrust adaptive to the driving state of the vehicle for which skid occurrence is predicted. If this adaptation value is exceeded, skidding occurs or skidding is likely to occur.

This adaptation value is set as a value before skid occurrence on the basis of the road surface μ (road surface friction coefficients between the driving wheel and the road surface) obtained by a road surface shape and a road surface state (e.g., dry road surface, wet road surface) and the like. The adaptation value may be set in advance. The adaptation value is input into control section 120 if it is determined by skid determination section 122 to be in the skid state.

In the present preferred embodiment, the adaptation value is a measure of a degree of shortage (slip occurrence prediction) of a rear wheel load with respect to the driving force on the rear wheel.

As described above, at Step S32, if skid prediction section 124 determines that skidding is likely to occur, i.e., the vehicle is in a skid occurrence predicted state in which there is a possibility of skidding, the routine proceeds to Step S33. If it is not the skid occurrence predicted state, the process is finished. The process returns to Step S10 after it is finished, and the series of processes is repeatedly executed during driving of motorcycle 10.

Step S33 is a process performed by collaborative operation creating section 126 of control section 120. At Step S33, collaborative operation creating section 126 starts the active antiskid process in order to avoid skid occurrence. Moreover, at Step S33, collaborative operation creating section 126 starts the "restricted operation mode" in which driving control of engine body 6, generator 66, transmission 7 and the like is restricted before specifying a factor predicted to cause skid at Step S34 and Step S36 which will be described below.

Specifically, at Step S33, if the "restricted operation mode" is started, as described above, even if a shift change instruction is input in shift operation detecting section 118, for example, a shift change operation of transmission 7 is prohibited. Moreover, the operation of the throttle is controlled to become sluggish in the accelerator operation input in accelerator operation amount detecting section 114 as compared with the case in which skidding is not determined. Moreover, generator 66 having performed driving or regeneration has its output torque restricted. Furthermore, the antilock braking operation of the ABS hydraulic unit is prepared by starting to raise a pressure of standby hydraulic pressure in ABS hydraulic unit 133.

Step S34 is a process performed by skid prediction section 124 of control section 120. At Step S34, skid prediction section 124 determines whether or not it is a skid occurrence predicted state by the accelerator opening operation, i.e., an acceleration operation on the basis of the input information. In other words, at Step S34, control section 120 predicts a possibility of the occurrence of skidding on the determination of whether or not the accelerator opening operation which is expected to exceed a slip limit (a limit value at which slip is likely to occur) is performed if the operator continues the current accelerator opening operation. As a result, control section 120 determines the possibility of skid occurrence.

Specifically, at Step S34, skid prediction section 124 compares the slip limit thrust of a tire (rear wheel 13 which is the driving wheel) with the driving force acting on this tire (driving wheel). The slip limit thrust of the tire used at Step S34 is calculated by the rear wheel axle load and the road surface friction coefficients ("road surface μ") obtained in the passive antiskid process. Moreover, the driving force acting on the tire (rear wheel 13 which is the driving wheel) used at Step S34 is calculated from the engine rotation speed, the gear stage, and the acceleration opening.

At Step S34, skid prediction section 124 compares the driving force (driving force acting on the tire (rear wheel 13)) to be calculated with the previously calculated driving force, and if there is a rapid change in an increasing direction, a slip limit is modified in accordance with this change.

This rapid upward change in the driving force indicates that a value of the calculated actual driving force is different from the previously calculated driving force by a predetermined value or more, and it is caused by a change in the gear stage by a shift-down (kick-down) operation or a rapid opening operation of the accelerator. Here, skid prediction section 124 determines, on the basis of the input information, a upward change in the driving force by monitoring a differential value of the shift-down operation or the accelerator opening signal.

As described above, if it is determined at Step S34 that the vehicle is in the skid occurrence predicted state caused by the accelerator opening operation, the routine proceeds to Step S35. If it is determined that the vehicle is not in the skid occurrence predicted state caused by the accelerator opening operation, the routine proceeds to Step S36.

Step S35 is a process performed by collaborative operation creating section 126 of control section 120. At Step S35, collaborative operation creating section 126 mainly instructs electricity control section 134 and performs the traction control operation which is the active antiskid process using generator 66.

Specifically, at Step S35, collaborative operation creating section 126 performs the traction control operation to keep the acceleration force (driving force) at a level smaller than the frictional force generated between the road surface and the wheel (rear wheel 13 which is the driving wheel) by limiting the engine torque transmitted from engine body 6 (in detail, crankshaft 60) to rear wheel (driving wheel) 13 and acting as the acceleration force. As a result, the state in which the frictional force between the wheel (rear wheel 13 which is the driving wheel) and the road surface exceeds the acceleration force is ensured, so that slip of the wheel is avoided. In other words, at Step S35, electricity control section 134 performs the traction control operation by controlling generator 66 and DC/DC converter 144 (specifically increasing a generation load) on the basis of the instruction of the traction control operation instructed from collaborative operation creating section 126. Specifically, electricity control section 134 performs the traction control operation by decreasing the engine torque transmitted from engine body 6 to rear wheel (driving wheel) 13 on the basis of the instruction of the traction control operation from collaborative operation creating section 126.

Moreover, at Step S35, collaborative operation creating section 126 creates a control instruction value for collaborative operation to engine control section 136 and transmission control section 138 so as to assist the traction control operation by electricity control section 134 and instructs each of them. As a result, engine control section 136 controls the throttle opening degree and ignition and decreases the engine torque generated in engine body 6, i.e., decreases the engine torque transmitted from engine body 6 to rear wheel (driving wheel) 13 so as to assist the traction control operation. Moreover, transmission control section 138 restricts clutch disengagement/engagement or a shift change of transmission 7 on the basis of the instruction from collaborative operation creating section 126.

As described above, at Step S35, collaborative operation creating section 126 operates electricity control section 134, engine control section 136, and transmission control section 138 in a collaborative manner so as to decrease the acceleration force (driving force) in rear wheel (driving wheel) 13. As a result, grip of rear wheel (driving wheel) 13 is kept within a range not exceeding its grip limit thrust.

In a usual operation, generator 66 generates electricity by rotation of crankshaft 60 other than the case wherein the torque of crankshaft 60 is assisted during deceleration. Thus, generator 66 uses power by crankshaft 60 during the usual operation, i.e., absorbs power of crankshaft 60.

At Step S34 and Step S35, control section 120 (skid prediction section 124 and collaborative operation creating section 126) executes control mainly to increase the generation load (Step S35) even if the driver performs the accelerator opening operation exceeding the slip limit (Step S34).

Step S36 is a process performed by skid prediction section 124 of control section 120. At Step S36, skid prediction section 124 determines, on the basis of the input information, whether or not the vehicle is in the skid occurrence predicted state caused by the accelerator closing operation, i.e., a deceleration operation which is a negative acceleration operation. In other words, at Step S36, it is determined whether or not the driver performs the accelerator closing operation exceeding the slip limit.

Specifically, at Step S36, skid prediction section 124 compares the slip limit thrust of the tire (rear wheel 13 which is the driving wheel) with the negative driving force (negative acceleration force) acting on this tire (rear wheel 13 which is the driving wheel), i.e., the deceleration force. The slip limit thrust of the tire used at Step S36 is calculated by the rear wheel axle load and the road surface friction coefficients ("road surface μ") obtained by the passive antiskid process similar to the process at Step S34. Moreover, the deceleration force (negative driving force and negative acceleration force) acting on the tire (driving wheel) used at Step S36 is calculated from the engine rotation speed, the gear stage, and the accelerator opening.

Moreover, at Step S36, if there is a rapid upward change in the calculated driving force (the driving force acting on the tire) relative to the previously calculated driving force, skid prediction section 124 modifies the slip limit in accordance with this change.

This rapid upward change in the driving force is caused when the calculated actual driving force is different from the previously calculated driving force by a predetermined value or less, and it is caused by an increase in the engine rotation speed involving a gear change in the deceleration operation with shift-down or a rapid closing operation of the accelerator.

Here, skid prediction section 124 determines, on the basis of the input information, an upward change in the deceleration force, a negative driving force, by monitoring the shift-down operation or the differential value of the accelerator opening signal.

If it is determined at Step S36 that the vehicle is in the skid occurrence predicted state by an accelerator closing operation, the routine proceeds to Step S37, while if it is not in the skid occurrence predicted state by the accelerator closing operation, the process is finished. This process returns to Step S10 after it is finished, and the series of processes is repeatedly executed during driving of motorcycle 10.

Step S37 is a process performed by collaborative operation creating section 126 of control section 120. At Step S37, collaborative operation creating section 126 mainly instructs electricity control section 134 and performs the back torque limiter operation which is the active antiskid process using generator 66.

Specifically, at Step S37, collaborative operation creating section 126 limits the engine torque transmitted from engine body 6 (in detail, crankshaft 60) to rear wheel (driving wheel) 13 and acting as the deceleration force (negative driving force, negative acceleration force). As a result, collaborative operation creating section 126 performs the back torque limiter operation to keep the deceleration force (an absolute value of the deceleration force in calculation) in rear wheel 13 smaller than the frictional force generated between the road surface and the wheel (rear wheel 13 which is the driving wheel). As a result, at Step S37, collaborative operation creating section 126 ensures the state in which the frictional force between the wheel (rear wheel 13 which is the driving wheel) and the road surface exceeding the deceleration force and avoids slip of the wheel. In other words, at Step S37, electricity control section 134 performs the back torque limiter operation by controlling generator 66 and DC/DC converter 144 on the basis of the instruction of the back torque limiter operation instructed from collaborative operation creating section 126. By controlling generator 66 and DC/DC converter 144, electricity control section 134 performs the back torque limiter operation which is an operation to limit the negative engine torque transmitted from engine body 6 to rear wheel (driving wheel) 13. Specifically, electricity control section 134 decreases the generation load of generator 66 or supplies electricity to generator 66 from battery 142 through DC/DC converter 144 so as to drive the same and adjusts a generator torque added to crankshaft 60.

Moreover, at Step S37, collaborative operation creating section 126 creates a control instruction value for collaborative operation to engine control section 136 and transmission control section 138 so as to assist the back torque limiter operation by electricity control section 134 and instructs each of them. As a result, engine control section 136 controls the throttle opening degree and ignition so as to restrict the negative engine torque generated in engine body 6, i.e., restricts the engine torque transmitted from engine body 6 to rear wheel (driving wheel) 13 so as to assist the back torque limiter operation. Moreover, transmission control section 138 restricts clutch disengagement/engagement or a shift change of transmission 7 on the basis of the instruction from collaborative operation creating section 126.

As described above, at Step S37, collaborative operation creating section 126 restricts the deceleration force (negative driving force) in rear wheel (driving wheel) 13 by operating electricity control section 134, engine control section 136, and transmission control section 138 in a collaborative manner. As a result, the grip of rear wheel (driving wheel) 13 is kept within a range not exceeding its grip limit thrust.

At Step S36 and Step S37, control section 120 (skid prediction section 124 and collaborative operation creating section 126) prevents the deceleration force stronger than a predetermined deceleration force from being generated in the tire by controlling generator 66 (Step S37) even if the driver performs the accelerator closing operation exceeding the slip limit (Step S36). In other words, control section 120 controls generator 66 before rear wheel 13 slips and adjusts the deceleration torque of driving wheel 13.

Specifically, in the case of rapid closing of the accelerator during acceleration of the vehicle or during steady driving, even if the deceleration exceeding the slip limit of the rear wheel is reached without shift-down, slip is avoided in advance.

Figure 8:
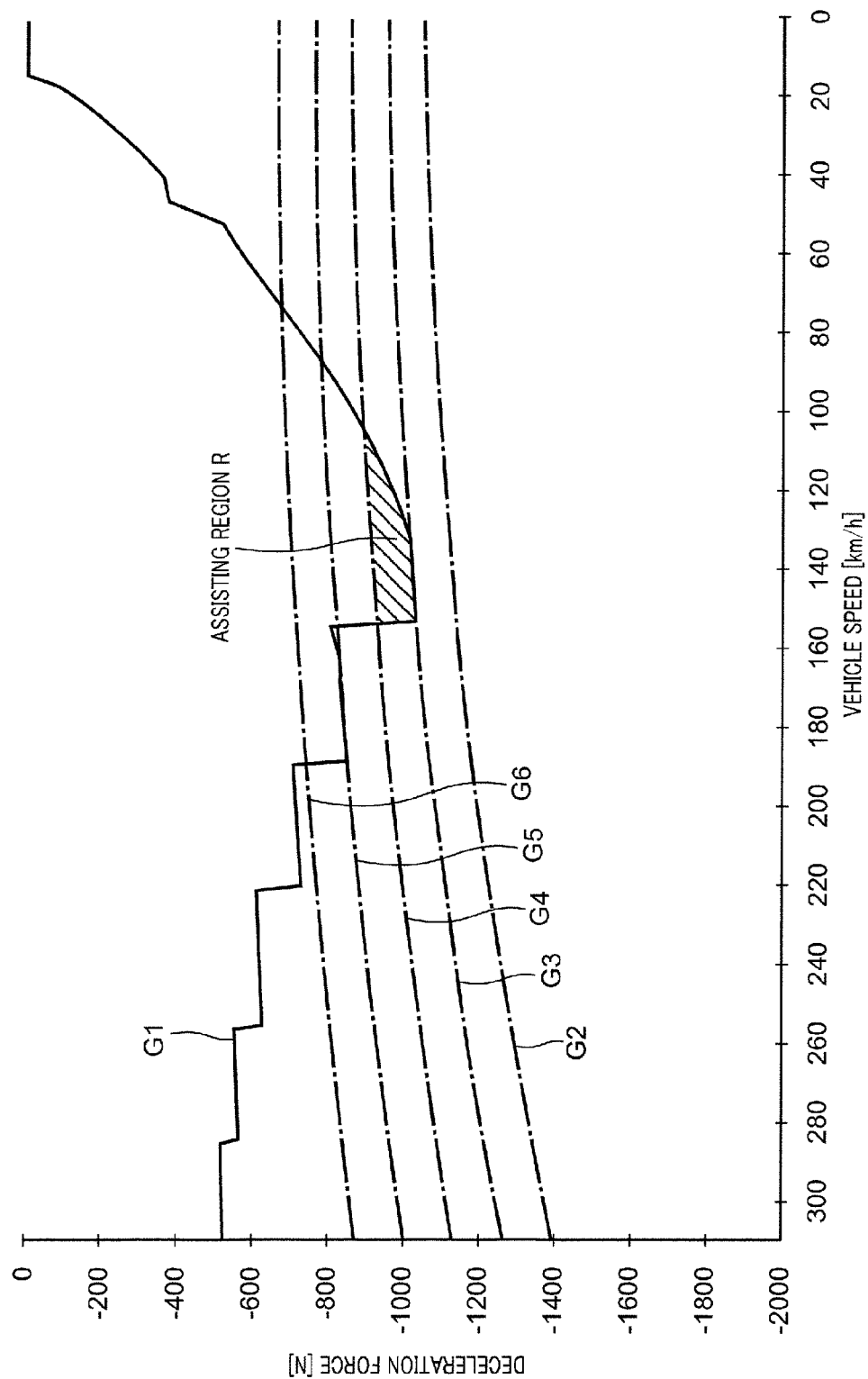
FIG. 8 is a diagram illustrating a deceleration force of a rear wheel when an accelerator pedal is fully closed involving shift-down.

FIG. 8 illustrates a deceleration force of the rear wheel in rapid closing of the accelerator.

In FIG. 8, the deceleration force of the rear wheel caused by the engine brake involving shift-down is illustrated by a graph G1, and a limit of the deceleration force not causing slip of the rear wheel is illustrated as a rear wheel deceleration force limit by graphs G2 to G6. The limit of the rear wheel deceleration force changes in accordance with a condition including the road surface μ that changes with rain, a tire and the like, and it is indicated here that G2 is the least likely to cause slip, while G6 indicates the limit of the deceleration force which is the most likely to cause slip, and slip becomes more likely from G2 to G6 in this order. The limits of the deceleration forces illustrated in graphs G2 to G6 are acquired in the determination in skid determination section 122 (see FIG. 5), i.e., stored and set on the basis of the information used in the determination in skid determination section 122.

As illustrated by graph G1 in FIG. 8, if the accelerator is rapidly closed during acceleration or during steady driving of the vehicle such as a motorcycle, engine brake is applied, and a vehicle speed is decelerated to 0 with a stepped increase in the deceleration force by shift-down via a portion in region R. However, depending on the specification or characteristics of the vehicle, as illustrated by the region R in graph G1, the rear wheel deceleration force might fall under the rear wheel deceleration limit (here, it is assumed to be G4). That is caused by an increase in the deceleration force (engine brake) transmitted from engine body 6 (crankshaft 60) to rear wheel 13 by the shift-down, which exceeds the limit of the deceleration force (G4) in rear wheel 13.

During similar deceleration of the parallel-hybrid type motorcycle 10 according to the present preferred embodiment including a regenerative function, a generation load is applied to generator 66 for regeneration with deceleration by control of control section 120. In parallel-hybrid type motorcycle 10, control is executed so as to increase the generation load of generator 66 in order to perform regeneration during deceleration. As a result, in the parallel-hybrid type motorcycle including the regenerative function, there is a concern that power absorption (engine brake) of engine body 6 (crankshaft 60) becomes larger than the case of no regeneration.

On the other hand, in motorcycle 10, electricity control section 134 executes control so that the generation load of generator 66 is decreased in the region R, and the deceleration force (engine brake) transmitted to rear wheel 13 from engine body 6 (crankshaft 60) through transmission 7 is reduced. Specifically, control section 120 executes control so that the rear wheel deceleration force does not exceed the limit of the deceleration force (G4) in rear wheel 13.

Moreover, in parallel-hybrid type motorcycle 10, electricity control section 134 supplies electricity to generator 66 from battery 142 through DC/DC converter 144 and assists/drives rotation of crankshaft 60 in the region R. Specifically, in the region R, electricity control section 134 adds a torque in a driving direction (positive) to the negative torque generated in engine body 6. As a result, electricity control section 134 executes control so as to decrease the negative torque output from crankshaft 60 in the region R. As a result, the deceleration force (engine brake) transmitted from engine body 6 (crankshaft 60) to rear wheel 13 is reduced. Specifically, control section 120 executes control so that the rear wheel deceleration force does not exceed the limit of deceleration force (Graph G4) in rear wheel 13.

In view of this point, in the present preferred embodiment, a control of assisting rotation of crankshaft 60 in generator 66 is performed at Step S37. As a result, by rapidly closing the accelerator by an accelerator operation, i.e., by rapid closing of the accelerator, acceleration performances including negative acceleration, i.e., deceleration is improved without slip even if deceleration is performed by engine brake.

As described above, the antiskid apparatus in motorcycle 10 in the present preferred embodiment is mounted on a hybrid vehicle including engine body 6 outputting a thrust of the vehicle, generator 66, battery 142, and transmission 7. Generator 66 is connected to crankshaft 60 of engine body 6 so as to assist the torque for the output of engine body 6 and generates an auxiliary driving force and that generates electricity by a rotational torque of crankshaft 60. Battery 142 supplies electricity to generator 66 and stores electricity generated by generator 66. Transmission 7 transmits rotation of crankshaft 60 and transmits it to rear wheel 13.

Antiskid apparatus includes control section 120 to control generator 66, and control section 120 controls generator 66 when the engine rotation speed is higher than a predetermined rotation speed during rapid deceleration in which vehicle deceleration speed is a predetermined value or more or during deceleration associated with shift-down through transmission 7 so as to adjust the deceleration torque of rear wheel 13 as follows. Specifically, by controlling generator 66, an operation of decreasing a generated amount of power from generator 66 is changed to an operation of assist driving of crankshaft 60.

As a result, the deceleration torque of rear wheel 13 is adjusted. Moreover, control section 120 controls the assisted driving of crankshaft 60 by generator 66 and regenerative driving of generator 66 on the basis of the input vehicle speed, acceleration/deceleration, gear shift stages, engine rotation speed, and acceleration operation amount.

Specifically, control section 120 controls generator 66 and controls operations from a regenerative power absorbing operation including the operation of decreasing the generated amount of power from generator 66 to an assisted driving operation of the crankshaft on the basis of the input vehicle speed, acceleration/deceleration, shift stages of transmission, shift change operation which is an operation of changing a shift stage, engine rotation speed, and acceleration operation amount.

Moreover, control section 120 detects slip of rear wheel 13 as a slip detecting section on the basis of the input vehicle speed, acceleration/deceleration and wheel rotation speed. Control section 120 detects slip of rear wheel 13 during deceleration of the vehicle and drives engine body 6 by controlling generator 66 so as to decrease the deceleration torque generated in rear wheel 13.

Thus, during driving with acceleration/deceleration, specifically, during deceleration which is negative acceleration or during acceleration, the driving force to rear wheel 13 through crankshaft 60 is assisted in the assisting region R without performing regeneration by generator 66 and by decreasing the generation load of generator 66. As a result, deceleration performances of the vehicle is improved.

The antiskid apparatus of the present preferred embodiment is configured to be used in dual-clutch type transmission 7 provided with first clutch 741 and second clutch 742 but may be configured to be used in a single clutch. In this case, too, the working effects similar to those of the antiskid apparatus mounted on motorcycle 10 are obtained.

The preferred embodiments disclosed herein are illustrative in all aspects and shall not be considered as limiting. The scope of the present invention is defined not by the description herein but by the appended claims and is intended to include all modifications, changes and adaptations within the meaning and equivalents of the appended claims.

The antiskid apparatus according to preferred embodiments of the present invention is preferably mounted on a parallel-hybrid type vehicle and has an effect that slip of the driving wheel is reliably avoided and is particularly useful as an apparatus to control a motorcycle on which a twin-clutch type transmission apparatus is mounted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antiskid apparatus for a hybrid vehicle, the hybrid vehicle including an engine that outputs a rotational power from a crankshaft as a propelling force of the vehicle; a power generator that is connected to the crankshaft of the engine, the power generator configured to be driven by the crankshaft to generate electricity and to generate an auxiliary driving force that assists driving of the crankshaft; a battery that supplies electricity to the power generator and is configured to store the electricity generated by the power generator; and a transmission that changes a rotation speed of the crankshaft and transmits the rotational power to a driving wheel, the antiskid apparatus comprising:
a generator control section programmed to adjust a deceleration torque of the driving wheel by controlling the power generator to change from an operation of decreasing a generated amount of power from the power generator to an operation of assisting driving of the crankshaft when an engine rotation speed is higher than a predetermined rotation speed during deceleration in which a vehicle deceleration speed is at a predetermined value or more or during deceleration associated with shift-down through the transmission.

2. The antiskid apparatus according to claim 1, wherein the generator control section is programmed to control the power generator to adjust the deceleration torque of the driving wheel before the driving wheel slips.

3. The antiskid apparatus according to claim 1, wherein the generator control section is programmed to control the power generator based on an input vehicle speed, acceleration/deceleration, a shift stage of the transmission, a shift change operation which is an operation of changing the shift stage, an engine rotation speed, and an acceleration operation amount to control operations including a regenerative electricity absorbing operation and an assisted driving operation of the crankshaft, the regenerative electricity absorbing operation including an operation of decreasing the generated amount of power from the power generator and an assisted driving operation of the crankshaft.

4. The antiskid apparatus according to claim 2, wherein the generator control section is programmed to control the power generator based on an input vehicle speed, acceleration/deceleration, a shift stage of the transmission, a shift change operation which is an operation of changing the shift stage, an engine rotation speed, and an acceleration operation amount to control operations including a regenerative electricity absorbing operation and an assisted driving operation of the crankshaft, the regenerative electricity absorbing operation including an operation of decreasing the generated amount of power from the power generator and an assisted driving operation of the crankshaft.

5. The antiskid apparatus according to claim 1, further comprising:
a slip detecting section that detects slip of the driving wheel based on an input vehicle speed, acceleration/deceleration, and wheel rotation speed; wherein
the slip detecting section detects the slip of the driving wheel during deceleration of the vehicle and drives the engine by controlling the power generator to decrease the deceleration torque generated in the driving wheel.

6. The antiskid apparatus according to claim 2, further comprising:
a slip detecting section that detects slip of the driving wheel based on an input vehicle speed, acceleration/deceleration and wheel rotation speed, wherein
the slip detecting section detects the slip of the driving wheel during deceleration of the vehicle and drives the engine by controlling the power generator to decrease the deceleration torque generated in the driving wheel.

7. The antiskid apparatus according to claim 3, further comprising:
a slip detecting section that detects slip of the driving wheel based on the input vehicle speed, acceleration/deceleration, and wheel rotation speed; wherein
the slip detecting section detects the slip of the driving wheel during deceleration of the vehicle and drives the engine by controlling the power generator to decrease the deceleration torque generated in the driving wheel.

8. The antiskid apparatus according to claim 4, further comprising:
a slip detecting section that detects slip of the driving wheel based on the input vehicle speed, acceleration/deceleration, and wheel rotation speed, wherein
the slip detecting section detects the slip of the driving wheel during deceleration of the vehicle and drives the engine by controlling the power generator to decrease the deceleration torque generated in the driving wheel.

9. The antiskid apparatus according to claim 1, wherein the transmission includes:
a first clutch and a second clutch to which the rotational power is transmitted from the crankshaft;
an output shaft that rotates and outputs a driving force to the driving wheel;
a first input main shaft parallel or substantially parallel to the crankshaft, the first input main shaft configured to receive the rotational power by engagement of the first clutch and transmit rotation to the output shaft through an odd-number stage shift gear mechanism including odd-number shift gear stages; and
a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

10. The antiskid apparatus according to claim 2, wherein the transmission includes:
a first clutch and a second clutch to which the rotational power is transmitted from the crankshaft;
an output shaft that rotates and outputs a driving force to the driving wheel;
a first input main shaft parallel or substantially parallel to the crankshaft, the first input main shaft configured to receive the rotational power by engagement of the first clutch and transmit rotation to the output shaft through an odd-number stage shift gear mechanism including odd-number shift gear stages; and
a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

11. The antiskid apparatus according to claim 3, wherein the transmission includes:
a first clutch and a second clutch to which the rotational power is transmitted from the crankshaft;
an output shaft that rotates and outputs a driving force to the driving wheel;
a first input main shaft parallel or substantially parallel to the crankshaft, the first input main shaft configured to receive the rotational power by engagement of the first clutch and transmit rotation to the output shaft through an odd-number stage shift gear mechanism including odd-number shift gear stages; and
a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

12. The antiskid apparatus according to claim 4, wherein the transmission includes:
   a first clutch and a second clutch to which the rotational power is transmitted from the crankshaft;
   an output shaft that rotates and outputs a driving force to the driving wheel;
   a first input main shaft parallel or substantially parallel to the crankshaft, the first input main shaft configured to receive the rotational power by engagement of the first clutch and transmit rotation to the output shaft through an odd-number stage shift gear mechanism including odd-number shift gear stages; and
   a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

13. The antiskid apparatus according to claim 5, wherein the transmission includes:
   a first clutch and a second clutch to which the rotational power is transmitted from the crankshaft;
   an output shaft that rotates and outputs a driving force to the driving wheel;
   a first input main shaft parallel or substantially parallel to the crankshaft, the first input main shaft configured to receive the rotational power by engagement of the first clutch and transmit rotation to the output shaft through an odd-number stage shift gear mechanism including odd-number shift gear stages; and
   a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

14. The antiskid apparatus according to claim 6, wherein the transmission includes:
   a first clutch and a second clutch to which the rotational power is transmitted from the crankshaft;
   an output shaft that rotates and outputs a driving force to the driving wheel;
   a first input main shaft parallel or substantially parallel to the crankshaft, the first input main shaft configured to receive the rotational power by engagement of the first clutch and transmit rotation to the output shaft through an odd-number stage shift gear mechanism including odd-number shift gear stages; and
   a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

15. The antiskid apparatus according to claim 7, wherein the transmission includes:
   a first clutch and a second clutch to which the rotational power is transmitted from the crankshaft;
   an output shaft that rotates and outputs a driving force to the driving wheel;
   a first input main shaft parallel or substantially parallel to the crankshaft, the first input main shaft configured to receive the rotational power by engagement of the first clutch and transmit rotation to the output shaft through an odd-number stage shift gear mechanism including odd-number shift gear stages; and
   a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

16. The antiskid apparatus according to claim 8, wherein the transmission includes:
   a first clutch and a second clutch to which the rotational power is transmitted from the crankshaft;
   an output shaft that rotates and outputs a driving force to the driving wheel;
   a first input main shaft parallel or substantially parallel to the crankshaft, the first input main shaft configured to receive the rotational power by engagement of the first clutch and transmit rotation to the output shaft through an odd-number stage shift gear mechanism set as odd-number shift gear stages; and
   a second input main shaft parallel or substantially parallel to the crankshaft, the second input main shaft configured to receive the rotational power by engagement of the second clutch and transmit rotation to the output shaft through an even-number stage shift gear mechanism including even-number shift gear stages.

17. A vehicle comprising the antiskid apparatus according to claim 1.

18. A motorcycle comprising the antiskid apparatus according to claim 1.

* * * * *